(12) United States Patent
Hernandez (10) Patent No.: US 7,597,524 B2
(45) Date of Patent: Oct. 6, 2009

(54) AUTOMOBILE JACK AND WHEEL DOLLY

(75) Inventor: Hector Ray Hernandez, Fullerton, CA (US)

(73) Assignee: Alltrade Tools LLC, Long Beach, CA (US)

( * ) Notice: Subject to any disclaimer, the term of this patent is extended or adjusted under 35 U.S.C. 154(b) by 259 days.

(21) Appl. No.: 11/590,292

(22) Filed: Oct. 31, 2006

(65) Prior Publication Data

US 2008/0101898 A1 May 1, 2008

(51) Int. Cl.
*B60B 29/00* (2006.01)
*B65G 7/00* (2006.01)

(52) U.S. Cl. ............... 414/428; 414/426; 414/427; 414/429

(58) Field of Classification Search ......... 414/426, 414/427, 429, 428, 465, 466
See application file for complete search history.

(56) References Cited

U.S. PATENT DOCUMENTS

| | | | |
|---|---|---|---|
| 217,669 A | 7/1879 | Adams | |
| 1,275,716 A | 8/1918 | Maurer, Jr. | |
| 1,361,889 A * | 12/1920 | Miller et al. | 414/428 |
| 1,650,031 A | 11/1927 | Nash | |
| 1,964,119 A | 6/1934 | Hendry | |
| 2,217,898 A | 10/1940 | Gemmill | |
| 2,252,534 A | 8/1941 | Trotter | |
| 2,326,684 A | 8/1943 | Ross | |
| 2,360,771 A | 10/1944 | Haberstump | |
| 2,362,981 A | 11/1944 | Baum | |
| 2,364,918 A * | 12/1944 | Roberson | 414/427 |
| 2,369,603 A * | 2/1945 | Phillips | 414/427 |
| 2,380,415 A * | 7/1945 | Carruthers | 414/429 |
| 2,386,516 A | 10/1945 | Thompson | |
| 2,410,902 A | 11/1946 | Roberts | |
| 2,467,500 A | 4/1949 | Salter | |
| 2,490,233 A | 12/1949 | Schildmeier | |
| 2,565,869 A * | 8/1951 | Marschke | 414/429 |
| 2,583,216 A | 1/1952 | Hoffman | |
| 2,644,597 A * | 7/1953 | Lewis | 414/427 |
| 2,725,998 A | 12/1955 | Huff | |
| 2,833,549 A | 5/1958 | Burch | |
| 3,036,723 A | 5/1962 | McCormick et al. | |
| 3,145,859 A | 8/1964 | Barosko | |
| 3,653,527 A | 4/1972 | Seymour | |
| 3,749,265 A | 7/1973 | Smith, Jr. | |
| 3,830,388 A | 8/1974 | Mott | |
| 3,836,027 A | 9/1974 | Gardner | |
| 3,847,294 A | 11/1974 | Davenport | |
| 3,850,321 A | 11/1974 | Virnig | |
| 3,951,287 A | 4/1976 | Cofer | |
| 3,954,198 A | 5/1976 | Sedelmayer | |
| 3,995,758 A | 12/1976 | Kovaleski | |

(Continued)

*Primary Examiner*—Saúl J Rodríguez
*Assistant Examiner*—Jonathan D Snelting
(74) *Attorney, Agent, or Firm*—Fulwider Patton LLP (57) ABSTRACT

A wheel dolly is disclosed that is suited to serve as both an automobile jack, capable of holding large loads aloft for extended periods, relying on only mechanical systems and eliminating hydraulic systems. In a further aspect, the wheel dolly of the present invention does not include extended arms, handles, or levers for pumping or rotating the lifting mechanisms. Each lifting element terminates in only a single nut exposed to the user. Preferably, each nut of each lifting system has the same plan dimensions as the other, thus providing the advantage of allowing the user to operate the dolly with a driver and only one socket.

8 Claims, 12 Drawing Sheets

U.S. PATENT DOCUMENTS

| | | |
|---|---|---|
| 4,042,139 A | 8/1977 | Pernsteiner et al. |
| 4,050,597 A | 9/1977 | Hawkins |
| 4,056,207 A | 11/1977 | Spilker |
| 4,401,405 A | 8/1983 | Ealet |
| 4,460,306 A | 7/1984 | Hawkins |
| 4,571,142 A | 2/1986 | Niewald et al. |
| 4,690,605 A | 9/1987 | Coccaro |
| 4,692,082 A | 9/1987 | Smith |
| 4,771,531 A | 9/1988 | Asher |
| 4,854,803 A | 8/1989 | Coccaro |
| 4,886,284 A | 12/1989 | Martinez, Jr. |
| 4,976,449 A | 12/1990 | Lotspeich et al. |
| 5,049,025 A | 9/1991 | Roman |
| 5,112,070 A | 5/1992 | Hahn |
| 5,135,346 A | 8/1992 | Roach |
| 5,161,931 A | 11/1992 | Mayer |
| 5,249,907 A | 10/1993 | Poten et al. |
| 5,732,931 A | 3/1998 | Massel |
| 5,732,960 A | 3/1998 | Elam |
| 5,735,538 A * | 4/1998 | Mosher et al. ............ 280/47.24 |
| 5,879,122 A | 3/1999 | Voetzke |
| 5,893,571 A | 4/1999 | Nowell |
| 6,179,542 B1 * | 1/2001 | Haven ..................... 414/428 |
| 6,688,836 B2 | 2/2004 | Gourand |
| 6,733,226 B1 | 5/2004 | Bonin |
| 6,773,222 B1 | 8/2004 | Gilchrist |
| 6,789,994 B2 | 9/2004 | Tortellier |
| 7,097,406 B1 | 8/2006 | Gang |
| 2001/0038094 A1 | 11/2001 | Lundy, Sr. et al. |
| 2004/0146384 A1 | 7/2004 | Whelan |

* cited by examiner

AUTOMOBILE JACK AND WHEEL DOLLY

TECHNICAL FIELD OF THE INVENTION

The present invention relates to mechanisms, such as wheel dollies, for manipulating heavy wheels for automobiles, trucks, and other vehicles. More particularly, the invention relates to a wheel dolly that is suitable also for use as an automobile jack, allowing an artisan to work beneath an automobile lifted by such a dolly.

BACKGROUND TO THE INVENTION

Wheel dollies are known in the art for lifting and moving heavy vehicular wheels. The wheels lifted by a dolly may be separate, or in pairs, and may be fixed to a vehicle. When all the wheels of a vehicle are lifted, if the dollies have their own caster wheels, the entire vehicle may be moved about a workshop to accommodate space requirements.

Commonly, dollies may involve pinching two arms horizontally together toward the perimeter of a wheel. The two arms provide a net upward force vector (and two inward vectors that cancel each other out), the upward force vector lifting the wheel. Alternatively a lifting structure may involve raising two parallel arms vertically upward, the arms carrying the wheel.

Yet, deficiencies remain in the prior art. One shortcoming found in prior art dollies is that they may be structured to require too much surrounding space for safe or efficient operation. For example, when a hydraulic system is used to power the lifting, the user must insert a long handle into the hydraulic unit and pump up the jack to the required extent. Thus, additional space must be found around the dolly for the user to stand and properly activate the hydraulic system. Likewise, when a threaded rod must be rotated, a handle is typically provided attached to the rod, and the user must wind the handle to lift the wheel to the extent required. Again, this requires additional space around the dolly in which the user must position himself to operate the device. In the same way, where a ratchet and pawl system is provided, the user must position himself beside the dolly and pump the ratchet lever to lift the wheel. In many workshop situations, this activity alongside the dolly may be cramped and inconvenient due to space restrictions, and space may be limited (a common feature of many workshops) to the point that the user may find himself obstructed in activating the dolly, or may knock into other sensitive equipment located nearby. To the extent the various levers and handles for activating the dolly protrude from the profile of the dolly, wheeling the dolly about a crowded workshop floor is attended by the added danger of bumping into sensitive equipment.

Another shortcoming in the prior art arises to the extent hydraulic systems are used to power a mechanism to lift the wheel. It is well known that hydraulic systems may be suitable for lifting a load, but they are not suitable for holding a load aloft for any length of time once lifted. This is because hydraulic systems are known to include structure prone to failure, such as O-rings, which may suffer the effects of aging and suddenly give way under load. Thus, where hydraulic systems are used for lifting, they cannot safely be used to hold heavy loads such as vehicles aloft sufficiently long for an artisan to work underneath the load. In short, while they may be used as wheel dollies to merely manipulate a wheel, they cannot safely be used alone as automobile support structure for any length of time. Typically, where hydraulic systems are used to achieve a lifting process in these circumstances, mechanical systems must be additionally introduced to securely support the load and provide safety for an artisan working underneath the vehicle—until such time as the hydraulic system may be used to lower the load once again. This method of operation has the further disadvantage that the additional mechanical system takes up even more room under the vehicle or load, thus denying a clear access to the artisan.

The prior art also lacks adequate simple and rapidly activatable structure to stabilize a dolly in relation to the floor and prevent it from accidentally moving laterally on its casters. Such prevention is especially desirable in the event that dollies are to serve the dual function of wheel handling system and automobile jack. It will be appreciated that an automobile jack that is not laterally stable would be particularly hazardous in use.

Another problem common in prior art dollies is that they do not possess sufficient degrees of freedom for moving a wheel, in that they cannot be controlled easily to position a wheel or an associated vehicular load within a large range of specific locations, both linear and rotational, when the dolly is in a stationary position. For example, some dollies are configured to lift a wheel by moving two parallel arms horizontally toward each other to pinch the wheel from opposite sides below its center point, providing a net upward force vector. However, while this pincer action feature is useful for easily positioning a dolly around the base of a wheel, such a dolly does not have much upward travel—being limited to the height of the arms above the floor. As a result, there may not be enough vertical room under a vehicle lifted in this way to permit an artisan to crawl underneath.

Other dollies have structure that moves directly upward, rather than horizontally, to lift a wheel. However, such dollies may be difficult to position around the base of a wheel because their lifting arms are commonly fixed a set distance apart, or are difficult to adjust. Thus, in dollies with arms horizontally fixed, where the arms are wider apart than necessary to engage a wheel, the arms must be lifted a certain amount before they engage the wheel. The amount thus lifted is lost vertical travel that cannot be imparted to lifting the wheel. Lost vertical travel may adversely affect the ability of the dolly to accomplish an intended task. On the other hand, the fixed arms of such a dolly may be too narrow to engage a large wheel, and in this case the dolly may be unusable.

Thus there is a need for a wheel dolly that may be used as an automobile jack such that it is safe for an artisan to work under loads lifted by the dolly for any length of time without the addition of further mechanical structure. There is a need for a wheel dolly that has increased degrees of freedom to assist in the accurate placement of a wheel or load over a wide range of specific positions. There is a need for a wheel dolly that may be rapidly and easily adjusted, and that does not include levers or handles protruding from the dolly profile that may constitute a hazard while the dolly is being moved, or in operation. The present invention addresses these and other needs.

SUMMARY OF THE INVENTION

According to a preferred embodiment of the invention, there is described a wheel dolly suitable for use as an automobile jack capable of holding aloft heavy loads for an extended period of time. In one aspect of the invention, the wheel dolly has two support arms for engaging a wheel, the arms being spaced a horizontal distance from each other. A base arm connects the support arms. The base arm is configured to have its length altered, for which purpose there is provided a first rotatable threaded rod extending axially along the base arm. The first threaded rod is configured to alter the length of the base arm when rotated. One of the ends of the first threaded rod is tipped only by a first nut rotationally fixed that end, the nut being configured to be rotationally driven by a driver. This aspect of the invention provides the dual advantages that the wheel dolly of the present invention is not burdened by arms and levers protruding from its profile, as these may represent hazards while the dolly is being wheeled about a workshop floor. A second advantage is that a user may apply a driver directly to the first nut, thereby easily adjusting the length of the base arm for capturing a wheel in the support arms.

In a further aspect of the invention, the base arm comprises a first member configured to have an adjustable length, and a second member configured to have an adjustable length, and to be movable in relation to the first member. A second rotatable threaded rod is provided, configured to move the second member in relation to the first member when rotated, for lifting the wheel engaged by the arms. This aspect has the advantage of relying on the mechanical support provided by the second rotatable threaded rod for lifting the wheel, and does not rely on a hydraulic system for direct lifting. Thus, the wheel and its load may be held aloft for extended periods, allowing a user to work underneath the load without the need for providing further mechanical structure as a safety feature. In yet a further aspect, the second threaded rod has one end tipped only by a second nut rotationally fixed to that end, the nut being configured to be driven by a driver. This feature has a similar advantage to that described for the first threaded rod tipped only by a nut. The wheel dolly has a clean profile without levers or handles extending from it, making it easier to move about a crowded workshop, and easy to operate with a driver that may be kept and stored separate from the dolly. In a further aspect, the second nut has the same plan dimensions as the first nut. This provides the user with the advantage of using only one driver with one socket to extend or contract the base arm, and to directly lift the load.

A further aspect of the invention is that each support arm includes a four bar linkage, which is superior to a cantilever system for elevating loads, in that it reduces large bending moments in the lifting arms by providing a pinned arm linkage system. Each four bar linkage is connected by a lifting element to the second member, whereby movement of the second member in relation to the first member rotates each four bar linkage under mechanical advantage. Each four bar linkage may have a roller pinned at its ends to rotate about the roller axis. These features provide a convenient further degrees of freedom to the wheel dolly, allowing easy and accurate placement of a wheel over a wide range of selected locations.

These and other advantages of the invention will become more apparent from the following detailed description thereof and the accompanying exemplary drawings.

DETAILED DESCRIPTION OF THE PREFERRED EMBODIMENTS

With reference to the drawings, which are provided by way of exemplification and not limitation, there is disclosed a wheel dolly suitable for using both as an automobile jack for holding heavy loads aloft for extended periods and to manipulate wheels, having features of the present invention.

Figure 1:
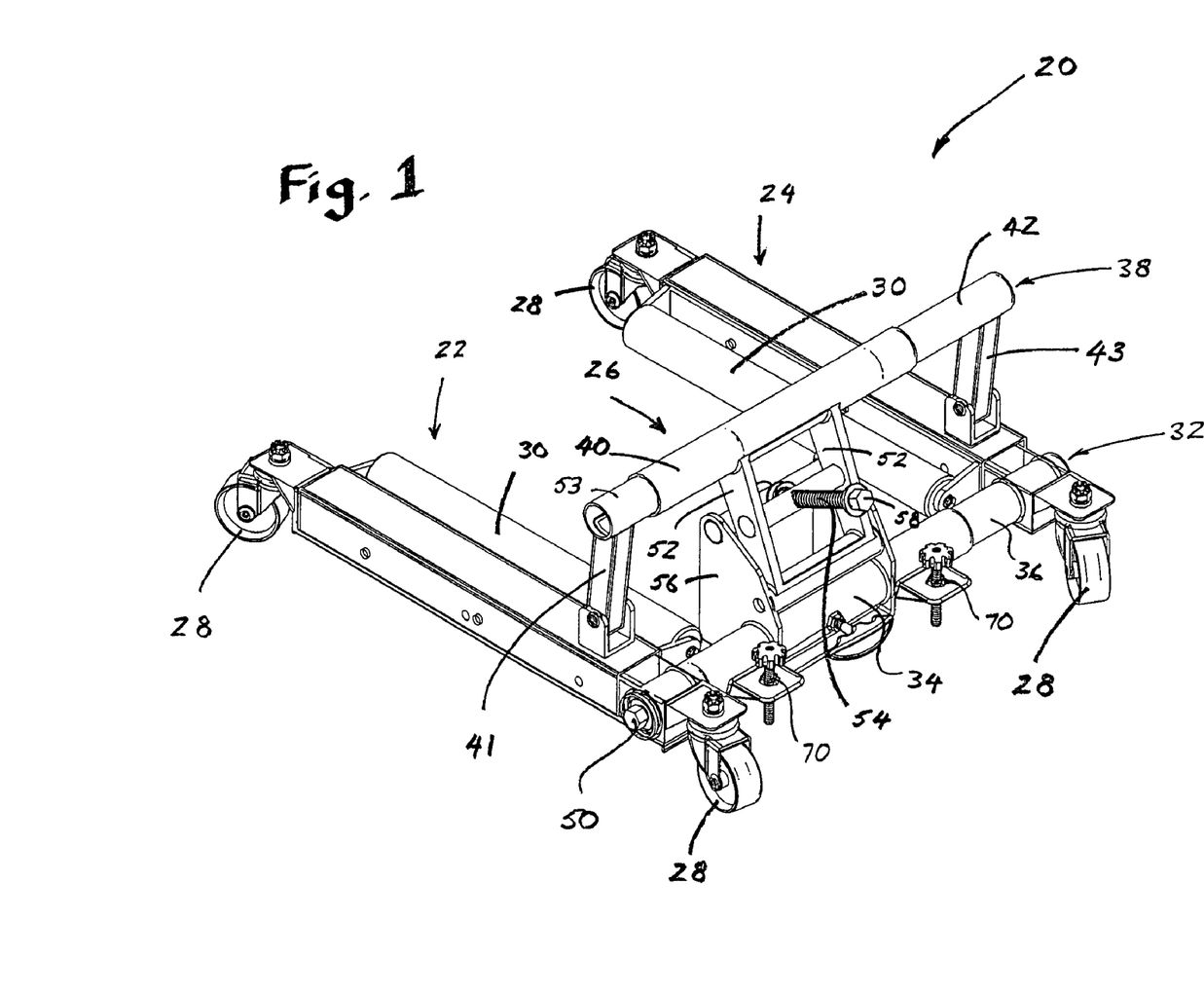
FIG. 1 is perspective view of a wheel dolly showing features of the present invention, the dolly being shown in a first lowered and contracted condition.
Figure 2:
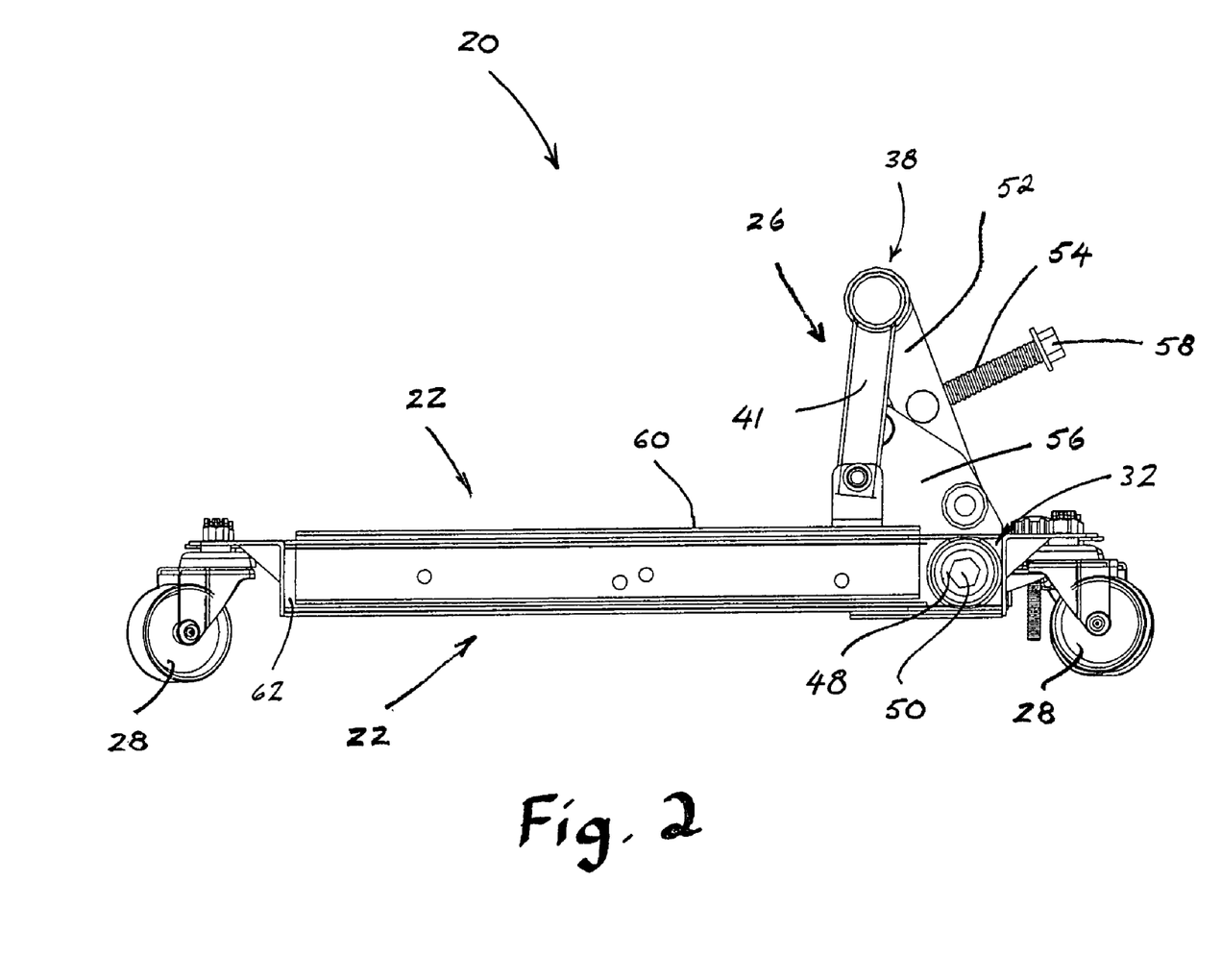
FIG. 2 a front elevational view of the wheel dolly of FIG. 1.
Figure 3:
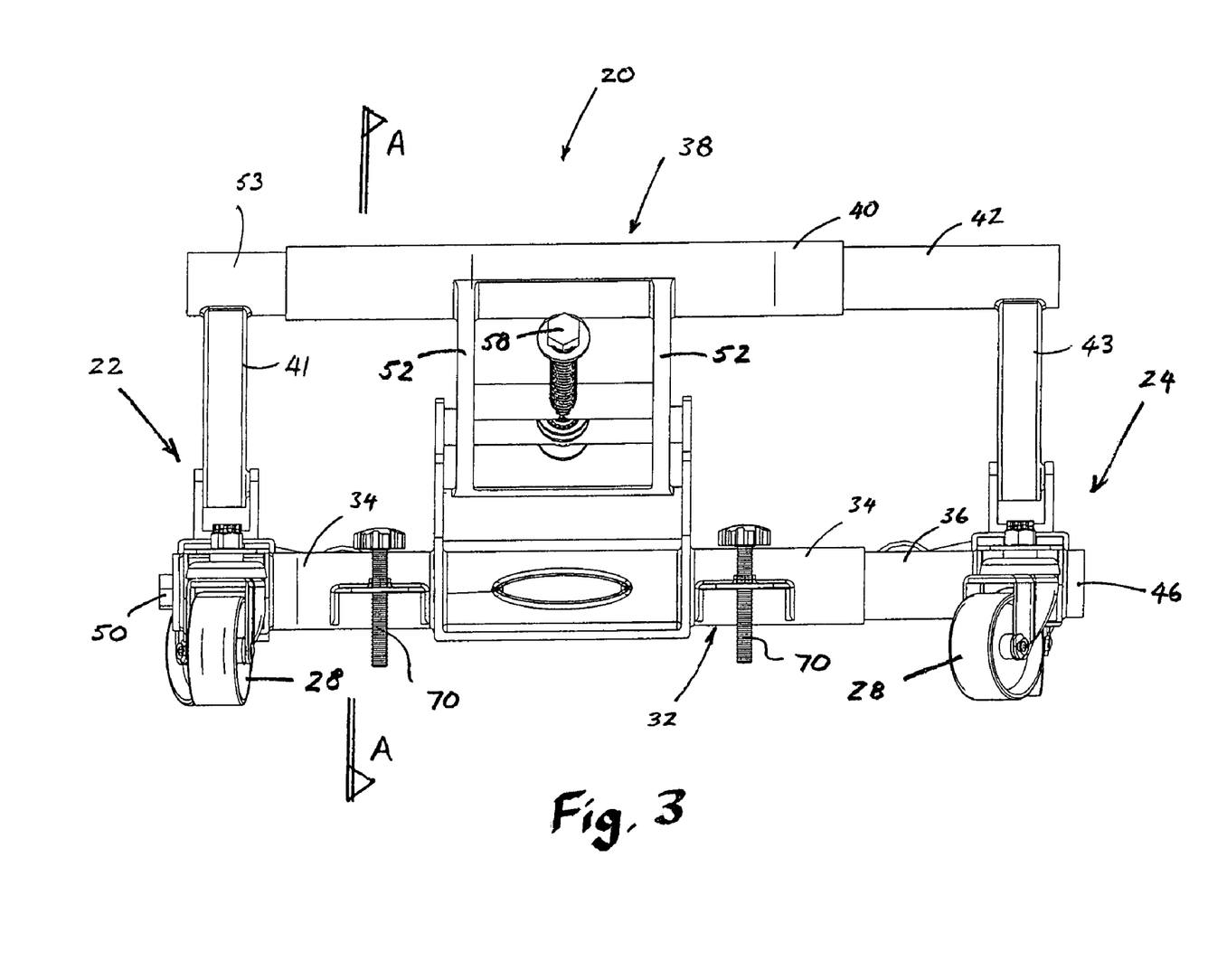
FIG. 3 is a side elevational view of the wheel dolly of FIG. 1.
Figure 4:
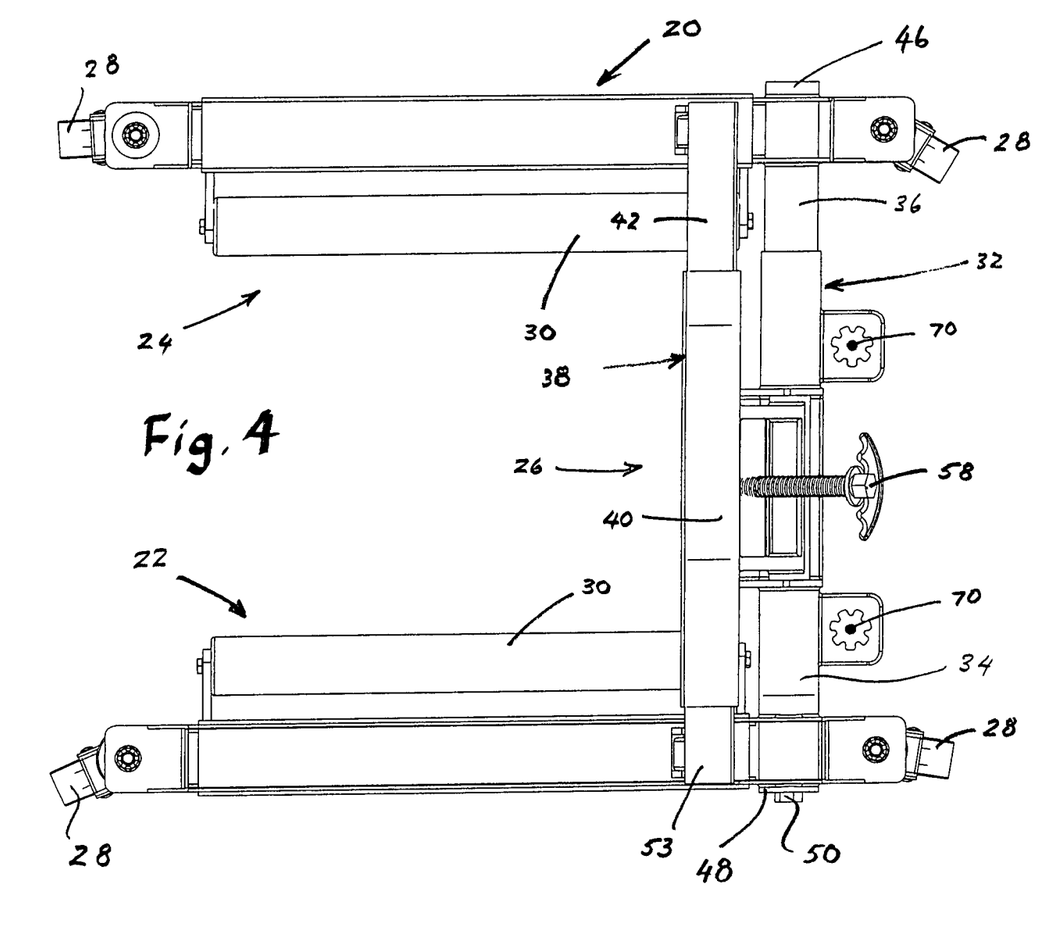
FIG. 4 is a plan view of the wheel dolly of FIG. 1.
Figure 5:
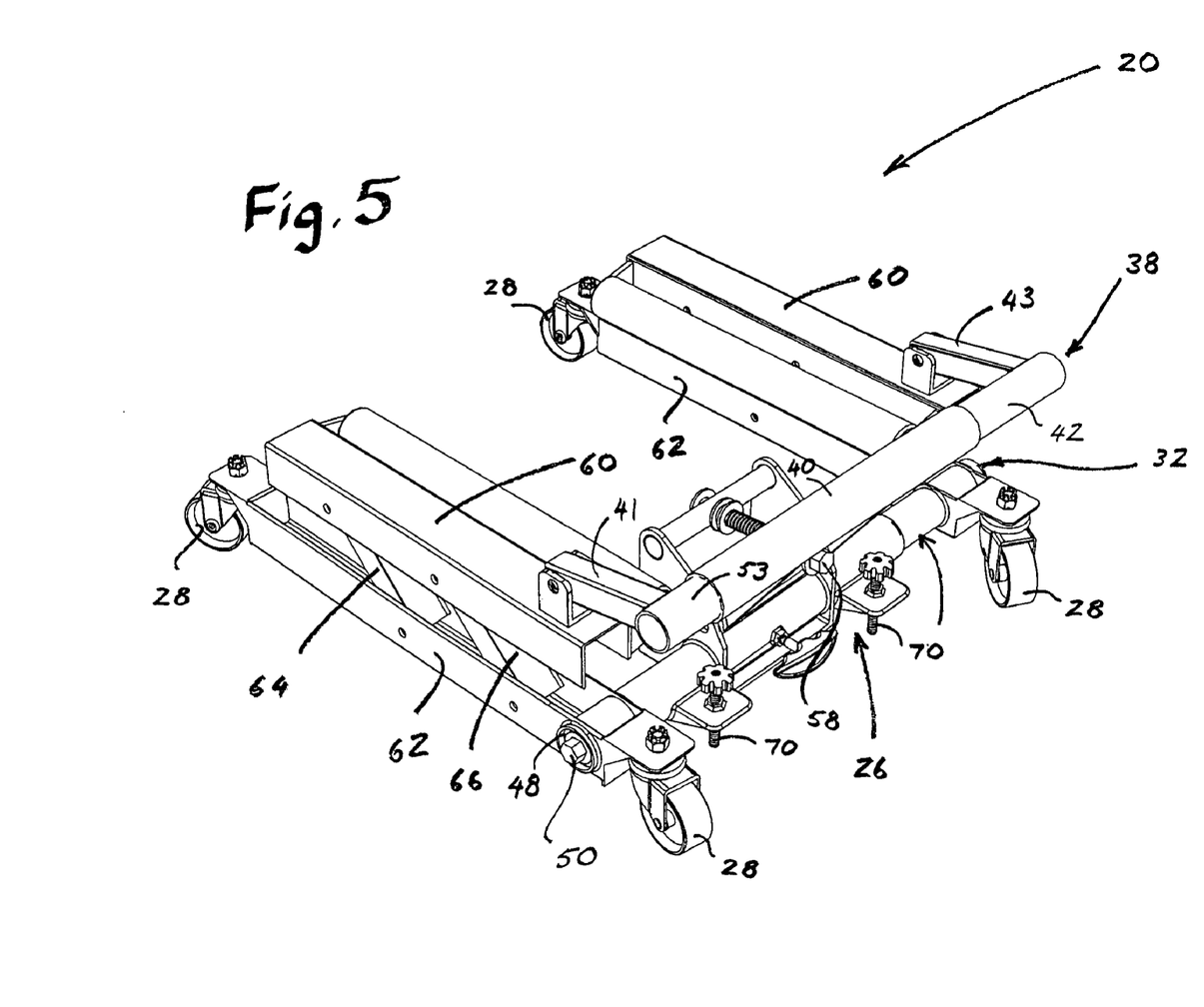
FIG. 5 is a perspective view of the wheel dolly of FIG. 1, the dolly being shown in a second elevated and contracted condition.
Figure 8:
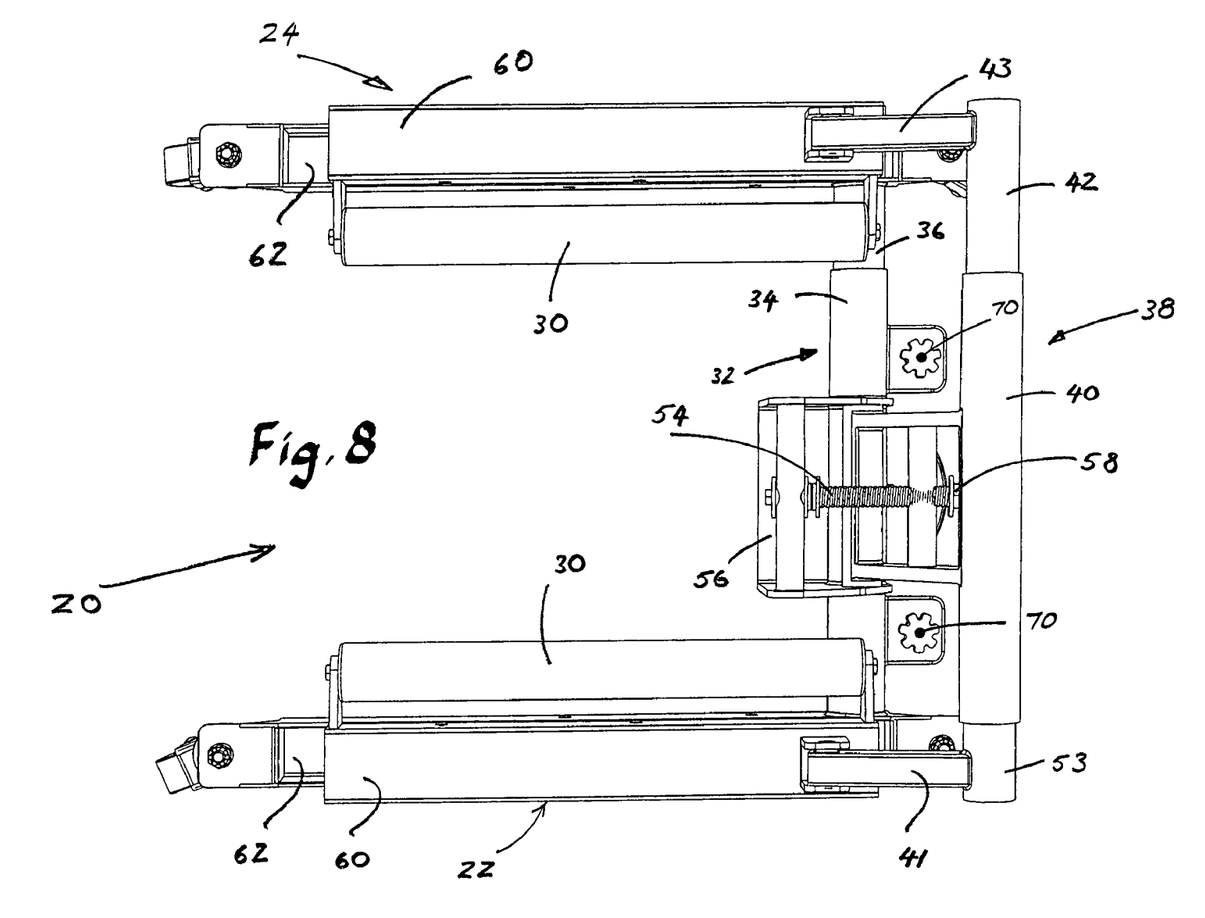
FIG. 8 is a plan view of the wheel dolly of FIG. 5.
Figure 10:
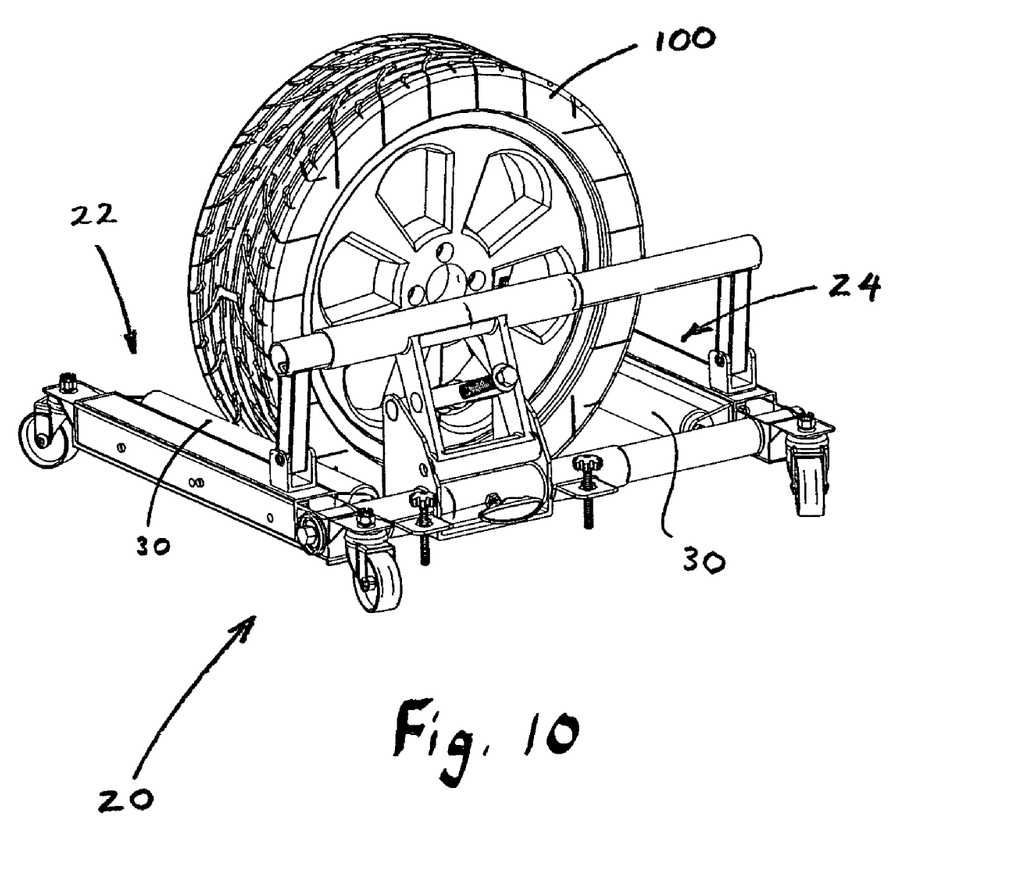
FIG. 10 is a perspective view of the wheel dolly of the preceding Figures, shown in a third lowered and extended condition, engaging a wheel.
Figure 11:
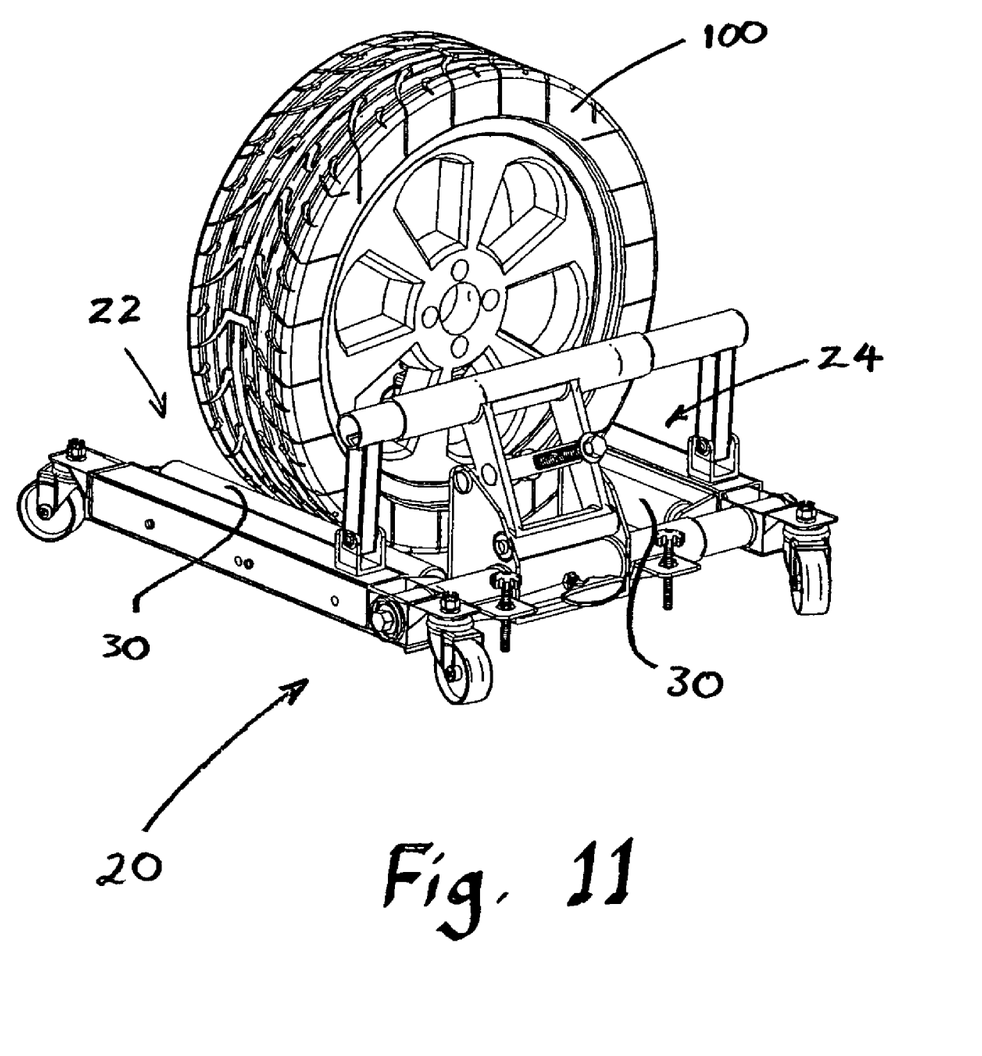
FIG. 11 is a perspective view of the wheel dolly of the preceding Figures, shown in a first lowered and contracted condition, supporting a wheel.
Figure 12:
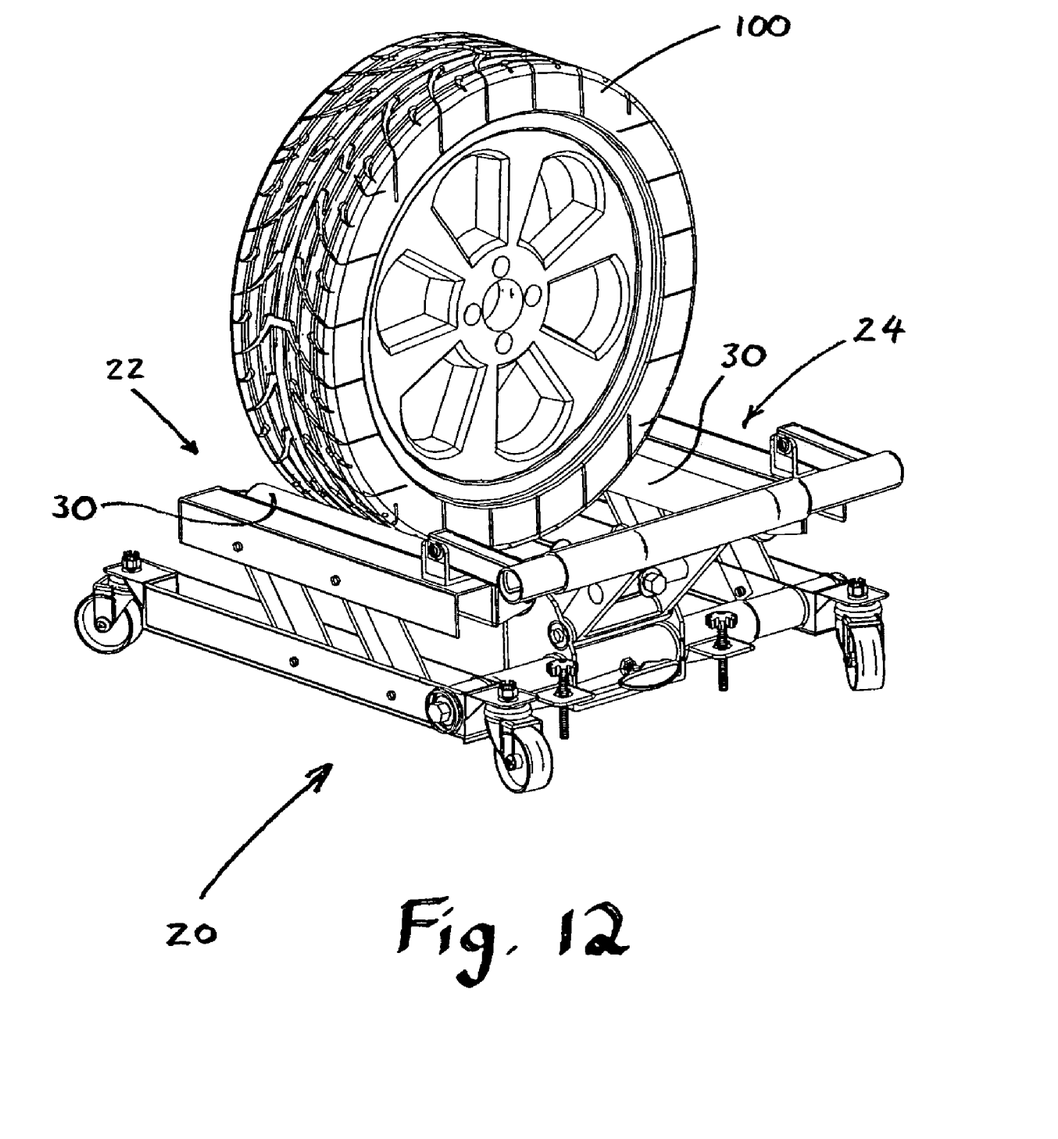
FIG. 12 is a perspective view of the wheel dolly of the preceding Figures, shown in a second elevated and contracted condition, supporting a wheel.

In a preferred embodiment of the present invention, a wheel dolly, generally characterized by the numeral 20, is formed into a U-shape (when viewed from above as in FIG. 4 and FIG. 8) by two parallel support arms, left arm 22 and right arm 24. The base of the U-shape is closed by a base arm 26 (FIG. 4 and FIG. 8), connected to ends of the parallel support arms 22, 24. At each corner of the dolly 20 a caster 28 may be fixed, allowing the dolly to be easily moved about a horizontal floor surface, including when carrying a load. Each parallel arm 22, 24 includes a cylindrical roller 30, pinned by the ends of the roller to points of support on the support arm. The rollers 30 are configured to collectively support a wheel 100 (as indicated in FIGS. 10-12) in a vertical position, and to rotate about the pinned ends so as to allow the wheel to be rotated about its center point. Further included as part of the support arms 22, 24 and base arm 26 are portions of a lifting mechanism, whose structure is described further below.

Figure 9:
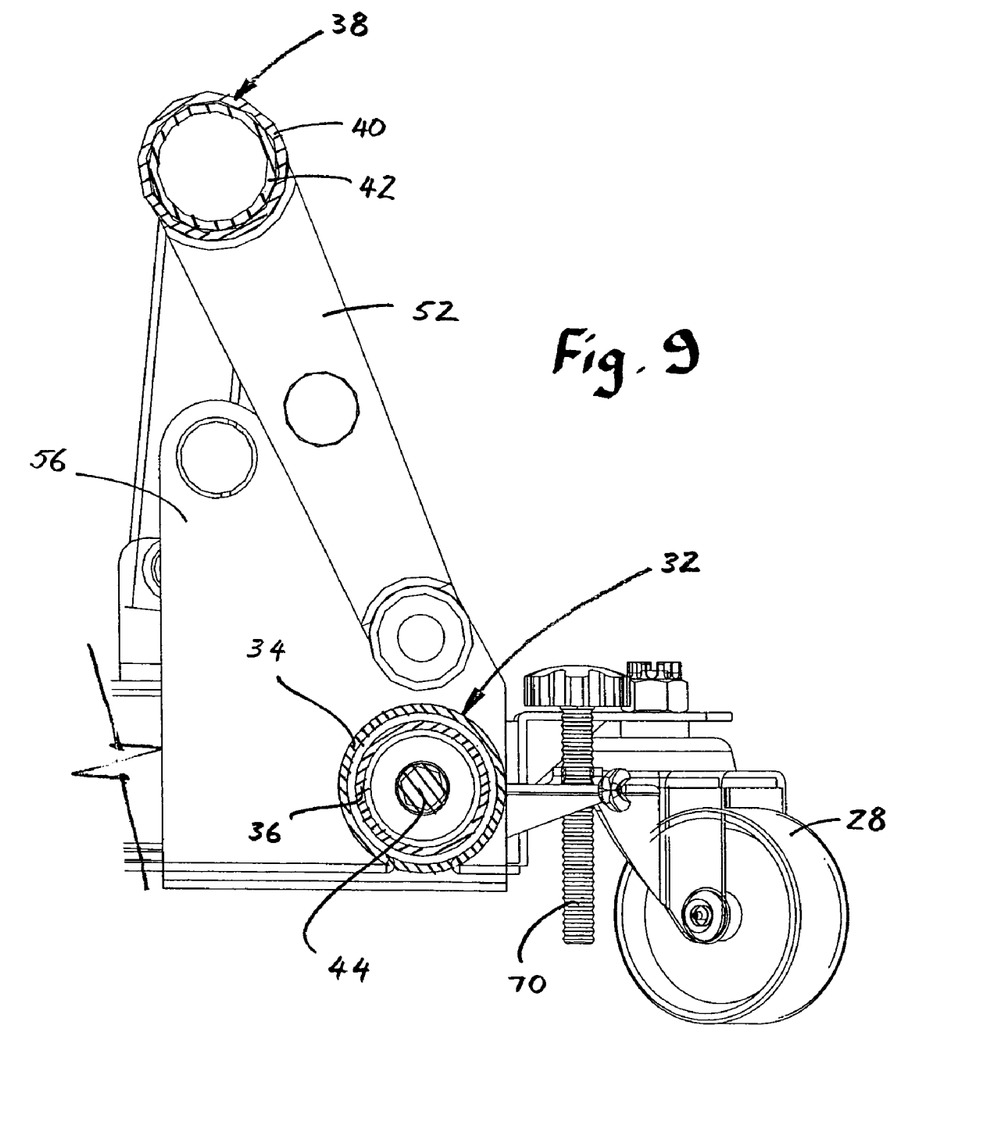
FIG. 9 is a partial sectional view of the wheel dolly in the preceding Figures, taken substantially along the line A-A in FIG. 3.

The base arm 26 preferably includes a first extension member 32 and a second extension member 38 positioned above, and parallel with, the first extension member. Each extension member is configured to lengthen and shorten, preferably by telescoping action. Thus, the first extension member has a first outer element 34 slidable along the outside of a first inner element 36. The second extension member has a second outer element 40, slidable along the outside of a second inner element 42. The first outer element 34 is held translationally immovable in relation to the second outer element 40 by a first lifting arm 41, and the first inner element 36 is held translationally immovable in relation to the second inner element 42 by a second lifting arm 43. A first threaded rod 44 (as seen in FIG. 9) is positioned within the first extension member 32. Where the first extension member connects to the right arm 24, the threaded rod 44 is attached by a threaded nut 46. (The nut 46 may preferably be positioned on the interior of first expansion member 32, and not at the terminal end of first expansion member as shown in the Figures, but somewhere along its length, so that there will be no need for the rod 44 to extend outside the profile of the dolly when the rod 44 is rotated.) Where the first extension member connects to the left arm 22, the threaded rod is attached by a threadless holding washer 48, and terminates in an extender nut 50, preferably a conventional hex-head nut, rotationally fixed to the threaded rod 44, so that rotation of the nut 50 causes rotation of the rod 44. The extender nut 50 is configured to be suitably exposed to the exterior of the dolly structure so that the nut 50 may conveniently be engaged by a hex-head socket driven by a powered driver such as a pneumatic or an electrical driver system, preferably by a rechargeable battery in the latter case. This aspect of the invention makes it convenient for the user to apply the driver to the nut 50 and spin the threaded rod 44 by merely depressing a trigger. Because the threaded rod 44 passes through the fixed threaded nut 46 on the first inner element 36, the first inner element will be translationally retracted or extended in relation to the first outer element 34 as the rod 44 is rotated clockwise or anticlockwise, respectively. It will be appreciated that, due to the interconnectedness of the outer elements 34, 40 to each other and the inner elements 36, 42 to each other via the lifting arms 41, 43 respectively, the force applied by the driver via the rod 44 and the extender nut 50 will also urge the second inner element 42 to be translationally retracted or extended in relation to the second outer element 40.

Thus, by applying a powered driver to the extender nut 50, a user may cause the two parallel arms 22, 24 to be forced toward each other in a pincer movement, or away from each other as desired, to capture a wheel 100 positioned on the floor (FIG. 10). The mechanical advantage provided by the threaded rod is sufficient to pull the arms together with enough force to lift loads which may be a wheel alone (FIG. 11) or the wheel may include a vehicle (not shown) attached. However, the lifting capacity of the wheel dolly 20 of the present invention is not limited to rotating the first threaded rod 44, but includes additional mechanical lifting structure as follows:

In order to provide direct upward movement of lifting structure, the second extension member 38 is configured so that its axis rotates through an arc about the first extension member 32. An arc arm 52 is pinned to the first extension member 32 at the lower end of the arc arm, and is fixed to the second extension member 38 at the upper end of the arc arm 52, thus allowing the second extension member to rotate in an arc about the first extension member 32. The position of the arc arm 52 is controlled by a second threaded rod 54 that runs through a threaded aperture in the arc arm. At its lower end, the threaded rod 54 is connected to a fixed washer that is indirectly supported by the first extension member 32 via a base unit 56. The upper end of the second threaded rod 54 terminates in a lifter nut 58, preferably of the same plan dimensions (i.e. looking down onto the circumferential profile of the nut) as the extender nut 50. The lifter nut 58 is fixed to the rod 54 so that rotation of the nut 58 causes rotation of the rod 54. Providing the lifter nut 58 with the same plan dimensions as the extension nut 50 has the advantage that a user may use the same socket affixed to a driver to operate both nuts 50, 58, without having to change the socket for each nut. It will be appreciated that rotation of the lifting nut 58 will cause the second extension member 38 to be forcibly rotated in an arc about the first extension member. The two lifting arms 41, 43 are each connected at their upper ends to the second extension member 38, and are each connected at their lower ends to the parallel arms 22, 24. Preferably, the second outer element 40 includes a torque relieving portion 53 that is free to rotate in relation to the balance of the second outer element 40. This free rotation provides a pin connection at both ends in the lifting arm 41 allowing it to adopt an equilibrium position without experiencing any bending as the arc arm 52 is rotated. The second inner element 42 may likewise rotate in relation to the second outer element 40, similarly eliminating bending in lifting element 43, and eliminating any torsion in the second extension member 38.

Figure 6:
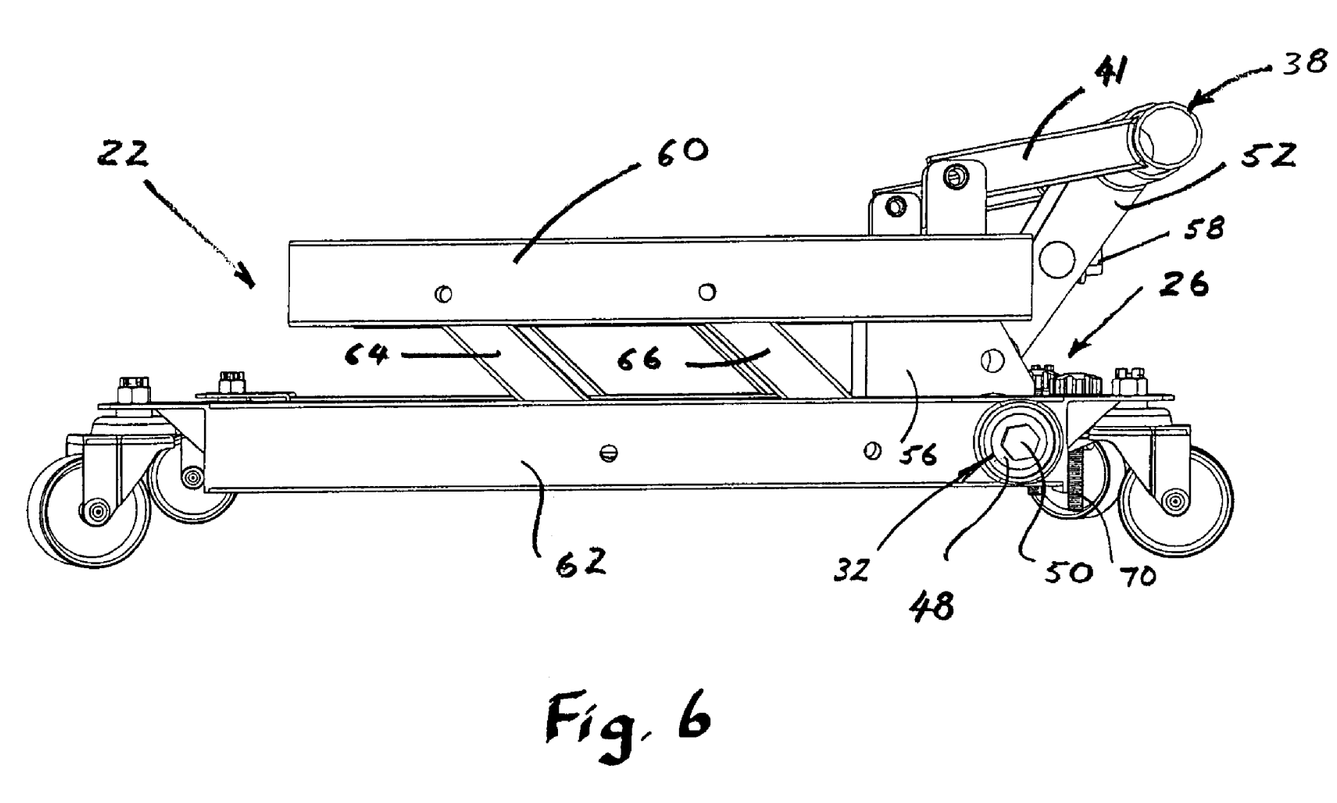
FIG. 6 is a front elevational view of the wheel dolly of FIG. 5.
Figure 7:
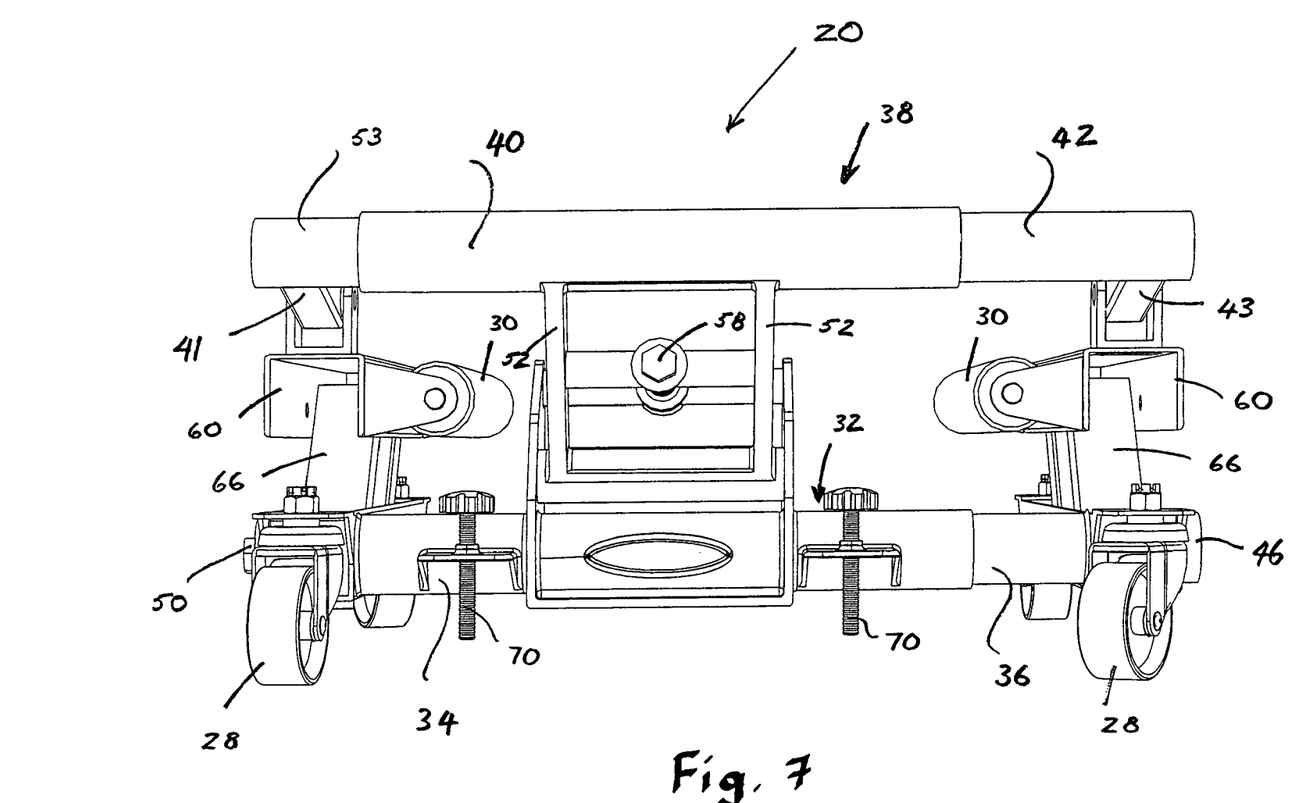
FIG. 7 is a side elevational view of the wheel dolly of FIG. 5.

The two parallel arms 22, 24 each include a rotatable four bar linkage (best seen in FIG. 6), each comprising an upper linkage 60, a lower linkage 62, a forward linkage 64 and a rearward linkage 66, the forward and rearward linkages attaching the upper linkage to the lower linkage by pin joints. A lower linkage 62 forms a fixed basis of each positioning arm 22, 24, and has casters 28 attached at each end. Thus, the other linkages 60, 64, 66 are movable in relation to the lower linkage 62. Each roller 30 is directly pinned to an upper linkage 60, so that upward and downward movement of the upper linkage will cause the roller also to rise and fall.

In a first lowered condition, exemplified in FIGS. 1-4, the wheel dolly 20 is first set (by operating the second threaded rod 54) such that the upper linkage 60 and the lower linkage 62 are adjacent each other. In this condition, a wheel may conveniently be captured between the two positioning arms 22, 24 by rotating the first threaded rod 44 via the extender nut 50 (FIG. 10). Specifically, the wheel may be captured by the rollers 30 attached to the upper linkages 60 of the positioning arms 22, 24. If need be, the wheel may be elevated to some extent by further forcing the positioning arms toward each other (FIG. 11). It will be appreciated that, at this stage, rotating the second threaded rod 54 clockwise via the lifter nut 58 will force the second extension member 38 to rotate in an arc anticlockwise (as viewed in FIG. 2) about the first extension member 32. This movement will, in turn, cause the lifting arms 41, 43 at the ends of the second extensible member 38 to apply to the upper linkages 60 a force vector upward and to the right (as viewed in FIG. 2). This force vector will cause the upper linkage 60 to separate upwardly from the fixed lower linkage 62 under considerable mechanical advantage, as exemplified in FIGS. 5-8. Thus, a wheel captured between the rollers 30 will be lifted upwardly (FIG. 12). If the wheel is attached to a vehicle, the vehicle itself will be lifted upwardly. If the wheel is not attached to a vehicle, but is intended for attachment to a vehicle, the rollers 30 permit the user to rotate the wheel slightly to line up the studs of the vehicle axle with the holes in the wheel.

Thus, it will be seen that the wheel dolly 20 of the present invention has four independent degrees of freedom. First, the dolly may be slid horizontally upon the floor by action of the casters 28. Second, rotation of the first threaded rod 44 via the extender nut 50 permits the user to set the space between the positioning arms 22, 24 to locate the positioning arms precisely around the base of the wheel, and further permits the user to elevate the wheel to some degree. Third, operation of the second threaded rod 54 via the lifter nut 58 permits the user to elevate the wheel by a significant amount under considerable mechanical advantage. Fourth, the rollers 30 permit the user to alter the rotational setting of the wheel by a desired amount. To provide lateral stability to the dolly 20 after it has been moved into a desired position on the casters 28, threaded studs 70 are provided. These may be screwed downward until they come into contact with the floor to anchor the dolly against lateral movement.

In addition to these advantages, the wheel dolly of the present invention is not dependent on the use of a hydraulic system, making it suitable for use as an automobile support jack for extended periods that does not require the introduction of additional mechanical structure to support a load while elevated for allowing an artisan to work underneath. It will be appreciated that, by jacking up a vehicle and holding it aloft by its wheels allows an artisan far more room to work underneath than if the vehicle had been jacked up by applying the lifting load at a point inward from the perimeter of the vehicle.

Finally, by providing two threaded rods that each terminate in an exposed nut having the same plan dimensions, the invention allows a user to rapidly and easily apply a powered driver with a single socket to rotate each nut. This feature allows immediate and efficient alteration of the settings of the dolly, and overcomes the disadvantages of prior art configurations which require the user to stand beside the dolly and laboriously rotate a threaded rod by hand, or pump a ratchet or a hydraulic system by hand.

Thus, it will be apparent from the foregoing that, while particular forms of the invention have been illustrated and described, various modifications can be made without parting from the spirit and scope of the invention.

I claim:

1. A wheel dolly comprising:
   two support arms for engaging a wheel, the support arms being spaced a horizontal distance from each other, wherein each support arm comprises a four bar linkage including a lower linkage and an upper linkage, each four bar linkage being configured to permit the upper linkage of each support arm to move upwardly in relation to the lower linkage;
   a base arm having two ends, each end being connected to one of the support arms;
   wherein, the base arm includes:
   a first member configured to have an adjustable length and extending along a first axis;
   a second member configured to have an adjustable length and extending along a second axis, the second member being configured to be movable in relation to the first member such that the second axis moves apart from the first axis;
   a first rotatable threaded rod extending within the first member, the first threaded rod configured, when rotated, to adjust the length of the first member and also to adjust the length of the second member;
   two lifting arms each having first and second ends, each lifting arm being pin connected at the first end to the second member of the base arm, and pin connected at the second end to one of the upper linkages; and
   a second rotatable threaded rod configured, when rotated, to move the second member in relation to the first member, whereby the second axis is moved apart from the first axis and each lifting arm is lifted, thereby lifting each upper linkage.

2. The wheel dolly of claim 1, wherein the second rotatable threaded rod is configured to move the second axis in an arc in relation to the first axis.

3. The wheel dolly of claim 1, wherein each upper linkage has a roller connected to the upper linkage, and each roller has an axis and is configured to engage the wheel and to rotate the wheel about an axis of the wheel.

4. The wheel dolly of claim 1, wherein the dolly includes a plurality of casters for moving the dolly horizontally.

5. The wheel dolly of claim 1 wherein the dolly includes at least one threaded stud for restricting the horizontal movement of the dolly, the threaded stud being configured to be extended downward to make contact with a horizontal floor surface.

6. The wheel dolly of claim 1, wherein the first member is adjustable in length by telescoping action of a first outer element slidable along the outside of a first inner element, and the second member is adjustable in length by telescoping action of a second outer element slidable along the outside of a second inner element, and further wherein the first outer element is held translationally immovable in relation to the second outer element by one of the two lifting arms, and wherein the first inner element is held translationally immovable in relation to the second inner element by the other of the two lifting arms.

7. The wheel dolly of claim 6, wherein the second outer element includes a portion that is free to rotate in relation to a remaining portion of the second outer element.

8. The wheel dolly of claim 6, wherein the second inner element is configured to rotate in relation to the second outer element.

* * * * *